US012639930B2

(12) United States Patent
Yu et al.

(10) Patent No.: US 12,639,930 B2
(45) Date of Patent: May 26, 2026

(54) METHOD FOR TRAINING IMAGE PROCESSING MODEL, IMAGE PROCESSING METHOD, APPARATUS, ELECTRONIC DEVICE, AND COMPUTER PROGRAM PRODUCT

(71) Applicant: TENCENT TECHNOLOGY (SHENZHEN) COMPANY LIMITED, Shenzhen (CN)

(72) Inventors: Xiaoming Yu, Shenzhen (CN); Yi Zhou, Shenzhen (CN); Yang Yi, Shenzhen (CN); Juanhui Tu, Shenzhen (CN); Feng Li, Shenzhen (CN); Xiaoxiang Zuo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 614 days.

(21) Appl. No.: 17/992,244

(22) Filed: Nov. 22, 2022

(65) Prior Publication Data

US 2023/0082715 A1     Mar. 16, 2023

Related U.S. Application Data

(63) Continuation of application No. PCT/CN2021/140902, filed on Dec. 23, 2021.

(30) Foreign Application Priority Data

Jan. 6, 2021     (CN) ......................... 202110014666.2

(51) Int. Cl.
        *G06V 10/774*          (2022.01)
        *G06T 7/50*            (2017.01)
                    (Continued)

(52) U.S. Cl.
        CPC .............. *G06V 10/774* (2022.01); *G06T 7/50* (2017.01); *G06V 40/161* (2022.01); *G06V 40/193* (2022.01); *G06T 2207/30201* (2013.01)

(58) Field of Classification Search
        CPC .. G06V 10/774; G06V 40/161; G06V 40/193; G06V 10/82; G06T 7/50;
                    (Continued)

(56) References Cited

U.S. PATENT DOCUMENTS

2014/0016871 A1     1/2014  Son et al.
2018/0025207 A1*    1/2018  Santos-Villalobos ..... G06T 5/50
                                                                382/117
                    (Continued)

FOREIGN PATENT DOCUMENTS

CN          107909058 A      4/2018
CN          108229284 A      6/2018
                    (Continued)

OTHER PUBLICATIONS

The World Intellectual Property Organization (WIPO) International Search Report for PCT/CN2021/140902 Mar. 1, 2022 6 Pages (including translation).
                    (Continued)

*Primary Examiner* — Jennifer Mehmood
*Assistant Examiner* — Vaisali Rao Koppolu
(74) *Attorney, Agent, or Firm* — Anova Law Group, PLLC

(57)                    ABSTRACT

A method for training an image processing model includes: acquiring a to-be-corrected eye image set matching a usage environment of the image processing model; performing style transfer on to-be-corrected eye images in the to-be-corrected eye image set through a style transfer network in the image processing model, to obtain a target eye image; acquiring a training sample matching the usage environment
                    (Continued)

Synthesized eye — Style transfer network — Real-style eye

To-be-corrected real-style eye — Gaze correction network — Corrected real-style eye / Weight transfer To-be-corrected real eye — Gaze correction network — Corrected real eye of the image processing model based on the to-be-corrected eye images and the target eye image, the training sample including object eye images matching different gaze positions; and training a correction network in the image processing model through the training sample matching the usage environment of the image processing model, to obtain a model update parameter matching the correction network, and generating a trained image processing model based on the model update parameter.

16 Claims, 6 Drawing Sheets

(51) Int. Cl.
    *G06V 40/16*        (2022.01)
    *G06V 40/18*        (2022.01)
(58) Field of Classification Search
    CPC ... G06T 2207/30201; G06T 5/60; G06T 5/80;
                G06T 5/94; G06T 2207/20084; G06T
                2207/10016; G06T 2207/20076; G06T
                2207/20081; G06N 3/045; G06N 3/08
    See application file for complete search history.

(56)                References Cited

U.S. PATENT DOCUMENTS

| | | | | |
|---|---|---|---|---|
| 2019/0266701 | A1 * | 8/2019 | Isikdogan | .............. G06V 10/82 |
| 2021/0152732 | A1 | 5/2021 | Eki | |
| 2021/0166088 | A1 * | 6/2021 | Chen | .................... G06V 40/171 |
| 2022/0103839 | A1 * | 3/2022 | Van Rozendaal | ...... G06N 3/045 |
| 2023/0401682 | A1 * | 12/2023 | Hu | ........................ G06V 10/774 |

FOREIGN PATENT DOCUMENTS

| | | | | | |
|---|---|---|---|---|---|
| CN | 108875524 | A | * | 11/2018 | ......... G06K 9/00597 |
| CN | 111709875 | A | * | 9/2020 | ............. G06N 3/045 |
| CN | 112329752 | A | | 2/2021 | |
| JP | 2019148980 | A | * | 9/2019 | |
| JP | 2020025261 | A | | 2/2020 | |

OTHER PUBLICATIONS

The Japan Patent Office (JPO) Notification of Reasons for Refusal for Application No. 2023-521165 and Translation Apr. 8, 2024 11 Pages.

Harsimran Kaur et al., "Subject guided eye image synthesis with application to gaze redirection." Proceedings of the IEEE/CVF Winter Conference on Applications of Computer Vision. 2021.

Takuya Inoue et al. "Image Synthesis of Eye Areas for Perceptually Establishing Eye-contacts between Video Conference Participants." IEEJ Transactions on Electronics, Information and Systems 138.11 (2018): 1399-1409.

Tongtong Zhao et al. "Image purification through controllable neural style transfer." 2018 International Conference on Information and Communication Technology Convergence (ICTC). IEEE, 2018.

Wataru Kumagai, "Machine Learning Framework towards Acquiring Versatility", The artificial intelligence towards acquisition of flexibility, The 34th vol. No. 5, Japanese Society for Artificial Intelligence, Sep. 1, 2019, 720-727.

Chuanqi Tan et al. "A survey on deep transfer learning." Artificial Neural Networks and Machine Learning—ICANN 2018: 27th International Conference on Artificial Neural Networks, Rhodes, Greece, Oct. 4-7, 2018, Proceedings, Part III 27. Springer International Publishing, 2018.

* cited by examiner

METHOD FOR TRAINING IMAGE PROCESSING MODEL, IMAGE PROCESSING METHOD, APPARATUS, ELECTRONIC DEVICE, AND COMPUTER PROGRAM PRODUCT

CROSS-REFERENCE TO RELATED APPLICATIONS

This application is a continuation application of PCT Patent Application No. PCT/CN2021/140902, filed on Dec. 23, 2021, which claim priority to Chinese patent application No. 202110014666.2, filed on Jan. 6, 2021, the entire content of all of which is incorporated herein by reference in their entirety.

FIELD OF THE TECHNOLOGY

The present disclosure relates to image processing technologies and, in particular, to a method for training an image processing model, an image processing method, an apparatus, an electronic device, a computer-readable storage medium, and a computer program product.

BACKGROUND OF THE DISCLOSURE

During video processing, gaze correction includes processing pictures containing eyes of objects (such as real people, animals, or cartoon characters), which can change the gaze direction of the eyes in a video. In an example that the objects are real people, gaze correction has practical value and broad prospects in communication scenarios such as video calls. However, due to the large variations in size, resolution, viewing angle, lighting, texture, and occlusion during capture of images or videos including eyes, the images rendered based on 3D modeling are usually significantly different from the real eye images in terms of texture and material, and lack naturalness. In addition, gaze correction using 3D devices requires high hardware costs. Further, gaze correction through a deep neural network requires a large number of training samples, which requires sample collection and labeling. Therefore, the model training efficiency is relatively low, resulting in large consumption of related computing resources.

SUMMARY

Embodiments of the present disclosure provide a method for training an image processing model, an image processing method, an apparatus, an electronic device, a computer-readable storage medium, and a computer program product, to improve efficiency of training an image processing model while ensuring a recognition precision of an image processing model and save related computing resources.

An embodiment of the present disclosure provides a method for training an image processing model, including: acquiring a to-be-corrected eye image set matching a usage environment of the image processing model; performing style transfer on to-be-corrected eye images in the to-be-corrected eye image set through a style transfer network included in the image processing model, to obtain a target eye image; acquiring a training sample matching the usage environment of the image processing model based on the to-be-corrected eye images and the target eye image, the training sample including object eye images matching different gaze positions; and training a correction network included in the image processing model through the training sample matching the usage environment of the image processing model, to obtain a model update parameter matching the correction network, and generating a trained image processing model based on the model update parameter. In some embodiments, eye images in the usage environment being corrected through the trained image processing model.

An embodiment of the present disclosure provides an image processing image, including: acquiring a face image of a target object; determining a corresponding to-be-corrected eye image based on the face image of the target object, the to-be-corrected eye image including a left eye image and a right eye image of the target object; correcting the to-be-corrected eye image through an image processing model, to obtain a corrected eye image; and replacing the to-be-corrected eye image in the face image with the corrected eye image, the image processing model being obtained by training of using the disclosed method for training the image processing model.

An embodiment of the present disclosure provides an apparatus for training an image processing model, including: a first information transmission module, configured to acquire a to-be-corrected eye image set matching a usage environment of the image processing model; and a training module, configured to perform style transfer on to-be-corrected eye images in the to-be-corrected eye image set through a style transfer network included in the image processing model, to obtain a target eye image, the training module being configured to acquire a training sample matching the usage environment of the image processing model based on the to-be-corrected eye images and the target eye image, the training sample including object eye images matching different gaze positions; the training module being configured to: train a correction network included in the image processing model through the training sample matching the usage environment of the image processing model, to obtain a model update parameter matching the correction network, and generate a trained image processing model based on the model update parameter, the eye images in the usage environment being corrected through the trained image processing model.

An embodiment of the present disclosure further provides an image processing apparatus, including: a second information transmission module, configured to acquire a face image of a target object; and an information processing module, configured to determine a corresponding to-be-corrected eye image based on the face image of the target object, the to-be-corrected eye image including a left eye image and a right eye image of the target object, the information processing module being configured to correct the to-be-corrected eye image through an image processing model, to obtain a corrected eye image; the information processing module being configured to replace the to-be-corrected eye image in the face image with the corrected eye image; and the image processing model being obtained by training by using the method for training an image processing model.

An embodiment of the present disclosure provides an electronic device, including: a memory, configured to store executable instructions; and a processor, configured to implement, when executing the executable instructions stored in the memory, the method for training an image processing model. The method includes: acquiring a to-be-corrected eye image set matching a usage environment of the image processing model; performing style transfer on to-be-corrected eye images in the to-be-corrected eye image set through a style transfer network included in the image processing model, to obtain a target eye image; acquiring a training sample matching the usage environment of the image processing model based on the to-be-corrected eye images and the target eye image, the training sample including object eye images matching different gaze positions; and training a correction network included in the image processing model through the training sample matching the usage environment of the image processing model, to obtain a model update parameter matching the correction network, and generating a trained image processing model based on the model update parameter, eye images in the usage environment being corrected through the trained image processing model.

An embodiment of the present disclosure provides an electronic device, including: a memory, configured to store executable instructions; and a processor, configured to implement, when executing the executable instructions stored in the memory, the disclosed image processing method.

An embodiment of the present disclosure provides a computer-readable storage medium, storing executable instructions, the executable instructions, when executed by a processor, implementing the method for training an image processing model. The method includes: acquiring a to-be-corrected eye image set matching a usage environment of the image processing model; performing style transfer on to-be-corrected eye images in the to-be-corrected eye image set through a style transfer network included in the image processing model, to obtain a target eye image; acquiring a training sample matching the usage environment of the image processing model based on the to-be-corrected eye images and the target eye image, the training sample including object eye images matching different gaze positions; and training a correction network included in the image processing model through the training sample matching the usage environment of the image processing model, to obtain a model update parameter matching the correction network, and generating a trained image processing model based on the model update parameter, eye images in the usage environment being corrected through the trained image processing model.

An embodiment of the present disclosure provides a non-transitory computer-readable storage medium, storing executable instructions, the executable instructions, when executed by a processor, implementing the disclosed image processing method.

An embodiment of the present disclosure provides a computer program product, including a computer program or an instruction, the computer program or the instruction causing a computer to perform the disclosed method for training an image processing model, or the disclosed image processing method.

The embodiments of the present disclosure at least provide the following beneficial effects.

The training sample matching the usage environment of the image processing model is acquired based on the to-be-corrected eye images and the target eye image, and the correction network included in the image processing model is trained through the training sample, so as to realize the correction of the eye images in the usage environment through the trained image processing model. As such, the training efficiency of the image processing model can be improved and the complexity of image processing can be reduced while the recognition precision of the image processing model is ensured, thereby saving related computing resources. Therefore, not only the training precision is satisfied, but also the generalization ability and the data processing ability of the image processing model are enhanced, which can adapt to different data processing environments, thereby enhancing the robustness of the image processing model.

DESCRIPTION OF EMBODIMENTS

Figure 1:
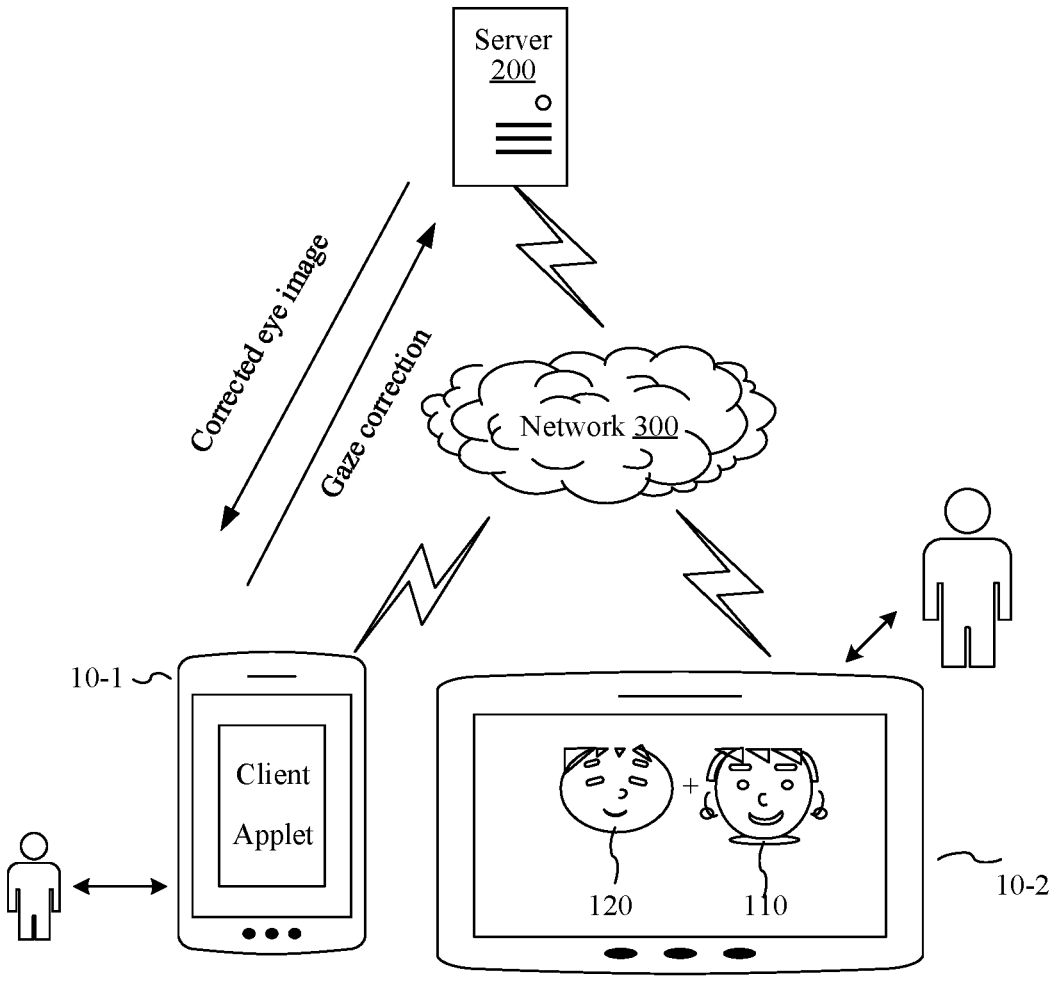
FIG. 1 is a schematic structural diagram of an image processing model according to an embodiment of the present disclosure.

To make the objectives, technical solutions, and advantages of the present disclosure clearer, the following describes the present disclosure in further detail with reference to the accompanying drawings. The described embodiments are not to be considered as a limitation to the present disclosure. All other embodiments obtained by a person of ordinary skill in the art without creative efforts shall fall within the protection scope of the present disclosure.

In the following descriptions, the term "some embodiments" describes a subset of all possible embodiments. However, it may be understood that the "some embodiments" may be the same subset or different subsets of all the possible embodiments, and may be combined with each other without conflict.

As used herein, the term "in response to" is used for representing a condition or a status on which a performed operation depend. When the condition or status is satisfied, the one or more performed operations may be real-time or may have a set delay. Unless explicitly stated, there is no chronological order between the plurality of performed operations.

As used herein, the term "client" refers to a carrier in a terminal that implements specific functions. For example, a mobile client (APP) is a carrier in a mobile terminal that implements specific functions, such as a function of performing online live broadcast (video streaming) or a function of playing an online video.

As used herein, the term "convolutional neural network (CNN)" refers to as a feed forward neural network that contains convolution calculation and has a deep structure, is one of representative algorithms of deep learning. The CNN has the representation learning ability, and can perform shift-invariant classification on input information according to a hierarchical structure of the input information.

As used herein, the term "model training" includes multi-classification learning on image datasets. The model may be constructed by using deep learning frameworks such as tensor flow and torch, and an image processing model is composed of a plurality of neural network layers such as the CNN.

As used herein, the term "neural network (NN)" or "artificial neural network (ANN)" refers to a mathematical model or a computational model that mimics a structure and a function of a biological neural network (an animal's central nervous system, especially the brain) in the field of machine learning and cognitive science, which is used for function estimation or approximation.

As used herein, the term "component" refers to a functional module of a view of an applet, and is also referred to as a front-end component, such as a button, a header, a table, a sidebar, content, and a footer in a page. The component includes modular code for reuse in different pages of the applet.

As used herein, the term "mini program" refers to a program that is developed based on a front-end-oriented language (such as JavaScript) and implements services in a hyper text markup language (HTML) page, which is software downloaded by a client (such as a browser or any client embedded with a browser core) through a network (for example, the Internet) and interpreted and executed in a browser environment of the client, and does not need to be installed in the client. For example, an applet in a terminal may be woken up through a voice command so that an applet for various services such as image editing and correction of character eye images can be downloaded and run in a social network client.

Before description of the image processing method provided in the embodiments of the present disclosure, an image processing model in an image processing scenario is described. The image processing model can correct an eye image of a target user to realize gaze correction.

In this process, the eye image is processed through a graph-based gaze correction method and a pixel-distortion-based gaze correction method. The graphics-based gaze correction method mainly means simulating continuous eye and head movements by using 3D eye models with artificial textures, and drawing eye images through geometric large-scale rendering by using a dynamic and controllable eye model. However, the eye image synthesized by using the method is significantly different from a real eye image. In addition, since the 3D eye model is required, which requires very high construction costs, the method is greatly limited during actual application. The distortion-based gaze correction method means predicting a distorted flow field by learning a distortion function, thereby directly generating a gaze-corrected image from an original eye image. For example, a deep feed-forward system combines the operating principles such as coarse and fine two-stage processing, image distortion, and intensity correction. An eye distortion field method that runs in real-time on a central processing unit (CPU) through a random forest prediction period. Since a distortion function is pose-specific, eye images with different gaze directions and head poses may be synthesized into a realistic image, to resolve head pose and gaze angle variations in practical application. However, eye images generally have complex textures, lighting, occlusions, and the like, and it is difficult to overall modify impact of these specific factors. Moreover, the images rendered based on 3D modeling are usually significantly different from the real eye images in terms of texture and material, and lack naturalness. However, gaze correction using 3D devices requires relatively high hardware costs. In addition, gaze correction through a deep neural network requires a large number of training samples, which requires sample collection and labeling, resulting in an increase in the costs.

In order to resolve the above defect, the embodiments of the present disclosure provide a method for training an image processing model, an image processing method, an apparatus, an electronic device, a computer-readable storage medium, and a computer program product, which can improve the training efficiency of the image processing model and reduce the complexity of image processing while ensuring the recognition precision of the image processing model. Therefore, not only the training precision is satisfied, but also the generalization ability and the data processing ability of the image processing model are enhanced, which can adapt to different data processing environments, thereby enhancing the robustness of the image processing model.

FIG. 1 is a schematic diagram of a use scenario of training of an image processing model according to an embodiment of the present disclosure. Referring to FIG. 1, a terminal (including a terminal 10-1 and a terminal 10-2) is provided with a client or an applet with an image processing function. An image processing apparatus in the present disclosure may be a server 200, and an image processing result of the image processing apparatus may be a terminal running various clients. The server and the terminal are connected by a network 300. The network 300 may be a wide area network or a local area network, or a combination thereof, which realizes data transmission through a wireless link. The terminal 10-1 submits a to-be-processed eye image. The image processing apparatus implements image processing in response to a trigger operation on an image transform function item, and the terminal 10-1 acquires and presents a corrected eye image.

In various embodiments of the present disclosure, the terminal 10-2 may run a video client. The video client may submit a corresponding image processing request to the server according to a to-be-corrected eye 120 and a target face 110 indicated by a user through various human-computer interactions (such as a gesture or a voice) on a playback interface. Therefore, when executable instructions in a storage medium of the server 200 are executed by a processor, the image processing method provided in the present disclosure is implemented, thereby realizing the corresponding eye image correction effect. For example, the above image processing process may be transferred to the server. Replaced images of different frames are re-coded by using hardware resources of a server of a video conferencing APP to form a video with an eye image correction effect, which may be retrieved by a user through an instant messaging client applet, or may be shared to different application processes of the user terminal 10-1.

In an example, the server 200 is configured to deploy an image processing model configured to: acquire, in response to an eye correction request, a face image of a target user captured by the terminal; determine a corresponding to-be-corrected eye image based on the face image of the target user, the to-be-corrected eye image including a left eye image and a right eye image of the target user; process the to-be-corrected eye image through an image processing model, to obtain a corrected eye image; and replace the to-be-corrected eye image in the face image with the corrected eye image. Certainly, before different face images are processed by the image processing model to generate corresponding classification results, the image processing model is trained, which includes:

acquiring a to-be-corrected eye image set matching a usage environment of the image processing model; process different to-be-corrected eye images in the to-be-corrected eye image set through a style transfer network included in the image processing model, to form a target eye image; acquire a training sample matching the usage environment of the image processing model based on the to-be-corrected eye images and the target eye image, the training sample including user eye images matching different gaze positions; and training a correction network of the image processing model through the training sample matching the usage environment of the image processing model, to obtain a model update parameter matching the correction network, and generating a trained image processing model based on the model update parameter, to realize correction of the eye images in the usage environment through the image processing model.

In various embodiments of the present disclosure, the terminal 10-2 may run a video client. The video client may acquire a to-be-corrected eye 120 and a target face 110 indicated by a user through various human-computer interactions (such as a gesture or a voice) on a playback interface, and generates a corresponding image processing request. Therefore, when executable instructions in a storage medium of the terminal 10-2 are executed by a processor, the image processing method provided in the present disclosure is implemented, thereby realizing the corresponding eye image correction effect, and forming a video with an eye image correction effect, which may be retrieved by a user through an instant messaging client applet, or may be shared to different application processes of the user terminal 10-1.

In an example, the terminal 10-2 is configured to deploy an image processing model configured to: acquire, in response to an eye correction request, a face image of a target user captured by the terminal; determine a corresponding to-be-corrected eye image based on the face image of the target user, the to-be-corrected eye image including a left eye image and a right eye image of the target user; process the to-be-corrected eye image through an image processing model, to obtain a corrected eye image; and replace the to-be-corrected eye image in the face image with the corrected eye image. Certainly, before different face images are processed by the image processing model to generate corresponding classification results, the image processing model is trained, which includes:

acquiring a to-be-corrected eye image set matching a usage environment of the image processing model; process different to-be-corrected eye images in the to-be-corrected eye image set through a style transfer network included in the image processing model, to form a target eye image; acquire a training sample matching the usage environment of the image processing model based on the to-be-corrected eye images and the target eye image, the training sample including user eye images matching different gaze positions; and train a correction network of the image processing model through the training sample matching the usage environment of the image processing model, to realize correction of the eye images in the usage environment through the image processing model.

Certainly, the image processing apparatus provided in various embodiments of the present disclosure is applicable to video conference activities through virtual resources or physical resources, or performs video conference activities in various physical video conference resources through a physical video conference resource payment environment (including but not limited to image processing environments for payment of various physical video conference resources) or a usage environment where social software exchanges information, or usually processes video conference information from different data sources during payment of virtual resources, to finally present a detection result matching the target user on a user interface (UI), and determines whether a detected image is a living face image of the user or attack information. The eye image is corrected on a current display interface to obtain a corrected eye image. The corrected eye image, a corresponding face classification result obtained from the face image, or the eye image detection result may be further invoked by other application programs.

The image processing method provided in the embodiment of the present disclosure is implemented based on artificial intelligence (AI). AI is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science. This technology attempts to understand the essence of intelligence and produce a new intelligent machine that can react in a manner similar to human intelligence. AI is to study the design principles and implementation methods of various intelligent machines, so that the machines can perceive, infer, and make decisions.

The AI technology is a comprehensive subject, relating to a wide range of fields, and involving both hardware and software techniques. Basic AI technologies generally include technologies such as a sensor, a dedicated AI chip, cloud computing, distributed storage, a big data processing technology, an operating/interaction system, and electromechanical integration. An AI software technology mainly includes several major fields such as a computer vision (CV) technology, a speech processing technology, a natural language processing technology, and machine learning/deep learning (DL).

In the embodiments of the present disclosure, the mainly involved AI software technologies include orientations such as the foregoing speech processing technology, and machine learning. For example, an automatic speech recognition (ASR) technology in the speech technology may be involved. The speech recognition technology includes speech signal preprocessing, speech signal frequency analyzing, speech signal feature extraction, speech signal feature matching/recognition, speech training, and the like.

For example, the ML may be involved. The ML is a multidisciplinary filed, and relates to a plurality of disciplines such as a probability theory, statistics, an approximation theory, a convex analysis, an algorithm complexity theory and the like. ML specializes in studying how a computer simulates or implements a human learning behavior to acquire new knowledge or skills, and reorganize an existing knowledge structure, so as to keep improving its performance. The ML is a core of the AI, is a fundamental way to make the computer intelligent, and is applied to various fields of the AI. The ML generally includes technologies such as DL, and the DL includes artificial neural network such as a convolutional neural network (CNN), a recurrent neural network (RNN), and a deep neural network (DNN).

The following describes a structure of an image processing apparatus according to the embodiment of the present

Figure 2:
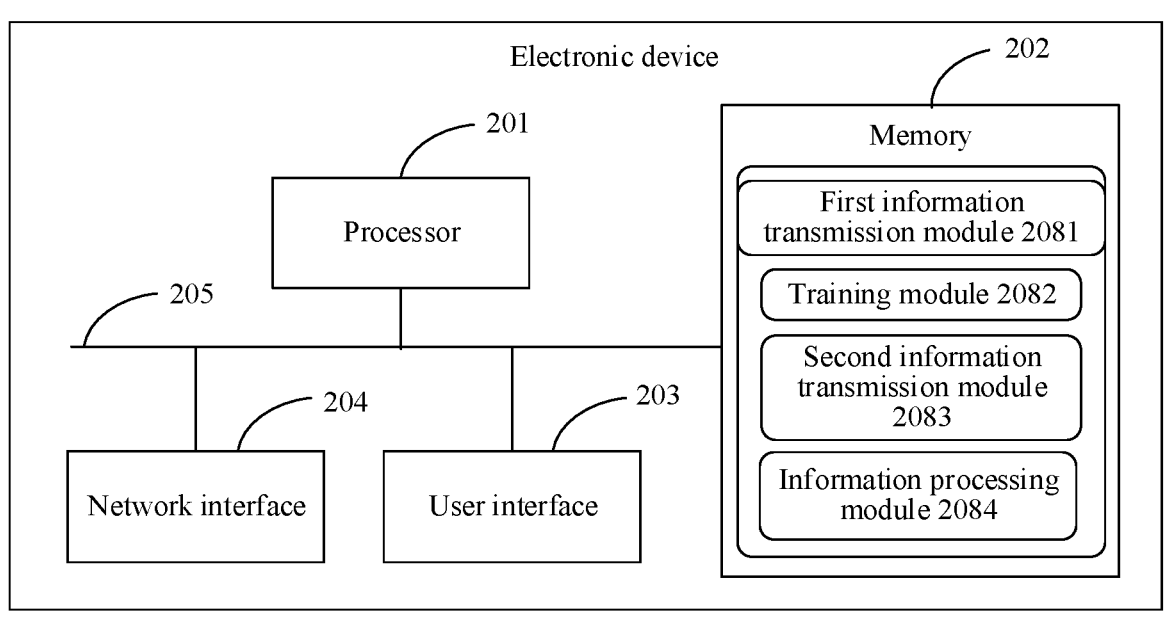
FIG. 2 is a schematic structural diagram of composition of an electronic device according to an embodiment of the present disclosure.

9 disclosure in detail. The image processing apparatus may be implemented in various forms, such as, a dedicated terminal with a processing function of the image processing apparatus, or a server disposed with a processing function of the image processing apparatus, such as the foregoing server 200 in FIG. 1. FIG. 2 is a schematic structural diagram of composition of an electronic device according to an embodiment of the present disclosure. It may be understood that FIG. 2 shows only an exemplary structure rather than a complete structure of an image processing apparatus and the apparatus for training an image processing model. The structure shown in FIG. 2 may be partially or entirely implemented based on requirements.

The image processing apparatus and the apparatus for training an image processing model provided in the embodiments of the present disclosure each include at least one processor 201, a memory 202, a user interface 203, and at least one network interface 204. Various assemblies in the image processing apparatus are coupled together through a bus system 205. It may be understood that the bus system 205 is configured to implement connection and communication between the components. In addition to a data bus, the bus system 205 further includes a power bus, a control bus, and a status signal bus. However, for ease of clear description, all types of buses in FIG. 2 are marked as the bus system 205.

The user interface 203 may include a display, a keyboard, a mouse, a trackball, a click wheel, a key, a button, a touchpad, a touch screen, or the like.

It may be understood that the memory 202 may be a volatile memory or a non-volatile memory, or may include both a volatile memory and a non-volatile memory. The memory 202 in the embodiments of the present disclosure can store data to support an operation of the terminal (such as, 10-1). Examples of the data include: any computer program operated on the terminal (such as, 10-1), such as, an operating system and an application program The operating system includes various system programs, such as, a frame layer, a core library layer, and a drive layer, used for implementing various basic services and processing tasks based on hardware. The application program may include various application programs.

In some embodiments, the image processing apparatus and the apparatus for training an image processing model provided in the embodiment of the present disclosure may be implemented by a combination of software and hardware. For example, the training apparatus provided in the embodiment of the present disclosure may be a processor in the form of a hardware decoding processor, and is programmed to perform the image processing method provided in the embodiment of the present disclosure. The apparatus for training an image processing model may be a processor in the form of a hardware decoding processor, and is programmed to perform the method for training an image processing model provided in the embodiment of the present disclosure. For example, the processor in the form of a hardware decoding processor may use one or more application-specific integrated circuits (ASIC), a DSP, a programmable logic device (PLD), a complex PLD (CPLD), a field-programmable gate array (FPGA), or another electronic element.

For example, the image processing apparatus and the apparatus for training an image processing model provided in the embodiment of the present disclosure are implemented by a combination of software and hardware. The image processing apparatus and the apparatus for training an image processing model provided in the embodiment of the present disclosure may be directly embodied as a combination of software modules executed by the processor 201. The software module may be located in a storage medium. The storage medium is located in the memory 202. The processor 201 reads executable instructions included in the software module in the memory 202. The image processing method and the method for training an image processing model provided in the embodiment of the present disclosure is completed in combination with necessary hardware (for example, including the processor 201 and another assembly connected to the bus 205).

For example, the processor 201 may be an integrated circuit chip, and has a signal processing capability, for example, a general purpose processor, a digital signal processor (DSP), or another programmable logical device, a discrete gate or a transistor logical device, or a discrete hardware component. The general purpose processor may be a microprocessor, any conventional processor, or the like.

In an example in which the image processing apparatus and the apparatus for training an image processing model provided in the embodiment of the present disclosure is implemented by hardware, the apparatus provided in the embodiment of the present disclosure may be directly executed by using the processor 201 in the form of a hardware decoding processor, such as, one or more ASICs, DSPs, PLDs, CPLDs, FPGAs, or other electronic elements, to execute the image processing method and the method for training an image processing model provided in the embodiment of the present disclosure.

The memory 202 in the embodiment of the present disclosure is configured store various types of data to support an operation of the image processing apparatus and the apparatus for training an image processing model. Examples of the data include: any executable instruction operated on the image processing apparatus, such as, an executable instruction. A program that implements the image processing method and the method for training an image processing model may be included in the executable instruction.

In some other embodiments, the image processing apparatus and the apparatus for training an image processing model provided in the embodiment of the present disclosure may be implemented by software. FIG. 2 shows the image processing apparatus and the apparatus for training an image processing model stored in the memory 202, which may be software in the form of a program and a plug-in and includes a series of modules. An example of a program stored in the memory 202 may include the image processing apparatus and the apparatus for training an image processing model. The image processing apparatus includes the following software modules: a first information transmission module 2081 and a training module 2082. The apparatus for training an image processing model includes a second information transmission module 2083 and an information processing module 2084. When the software modules in the image processing apparatus and the apparatus for training an image processing model are read by the processor 201 for execution, the image processing method and the method for training an image processing model provided in the embodiment the present disclosure are implemented.

Figure 3:
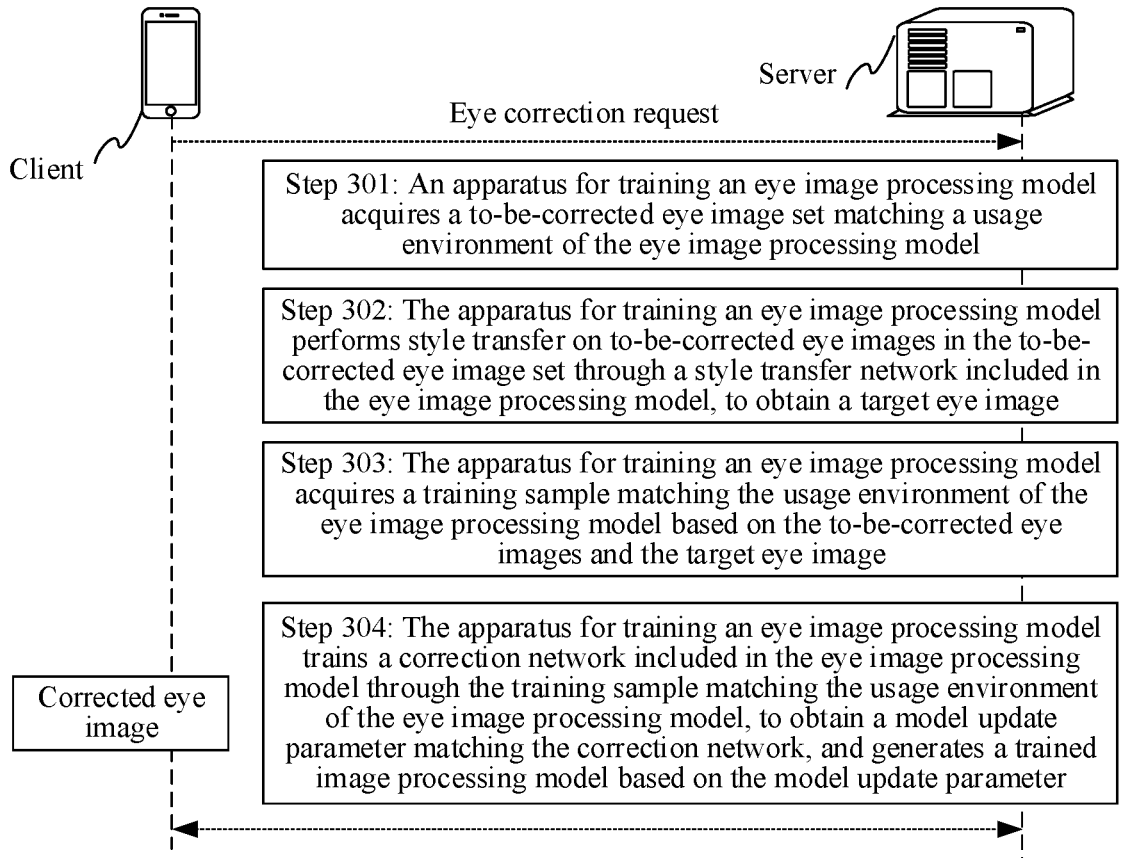
FIG. 3 is a schematic flowchart of a method for training an image processing model according to the present disclosure.

FIG. 3 is a schematic flowchart of the method for training an image processing model according to the present disclosure. It may be understood that steps shown in FIG. 3 may be performed by various electronic devices that run the apparatus for training an image processing model, such as a dedicated terminal with an eye information detection function or a video conference function or a server or a server cluster with an image processing model training function, to realize training and deployment of image processing models matching different video conference scenarios. The steps shown in FIG. 3 are exemplarily described below.

Step 301: The apparatus for training an image processing model acquires a to-be-corrected eye image set matching a usage environment of the image processing model.

The to-be-corrected eye image set includes face images of objects in different domains. The objects may be real persons or animals, or may be virtual persons or animals, such as cartoon characters.

In various embodiments of the present disclosure, the acquisition of the to-be-corrected eye image set matching the usage environment of the image processing model may be implemented by: acquiring face images captured by a capture device (such as a camera or a terminal with a camera function) in the usage environment of the image processing model; performing image augmentation on the face images to obtain a processing result of the image augmentation; determining face position coordinates in the processing result of the image augmentation, and intercepting face images including a complete eye image based on the face position coordinates; and performing depth processing on the face images including the complete eye image through a depth processing network included in the image processing model, to obtain depth maps of the face images; and using the depth maps as to-be-corrected eye images matching the usage environment of the image processing model, and using a set of the plurality of to-be-corrected eye images as the to-be-corrected eye image set.

Figure 4:
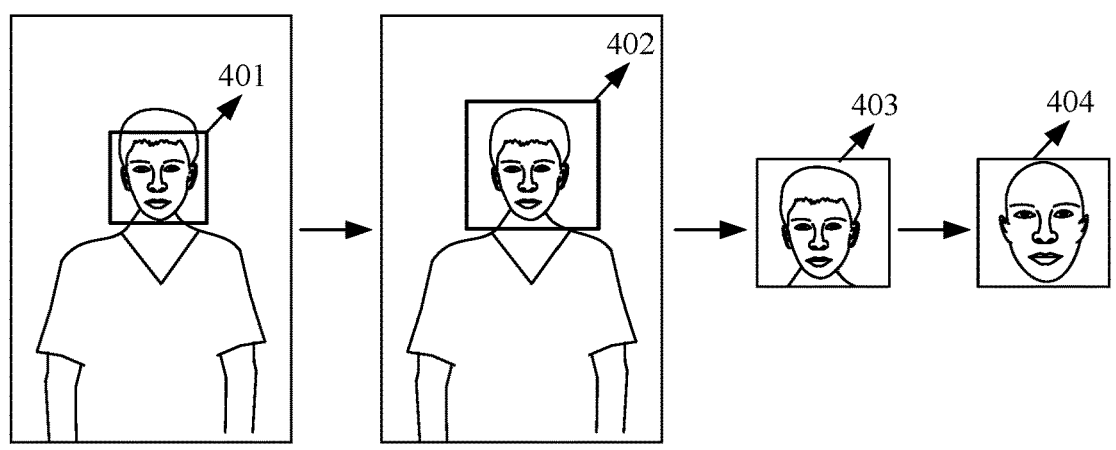
FIG. 4 is a schematic diagram of acquiring a face image according to an embodiment of the present disclosure.

FIG. 4 is a schematic diagram of acquiring a face image according to an embodiment of the present disclosure. For example, the object is a real user. After acquiring a user image captured by the capture device, a region 401 where a face of the user is located may be first defined by using a face detection technology, the region is expanded by different times to obtain more background content 402, and the face image including the background content is cropped to obtain a cropped face image 403. For example, the face image may be cropped by: marking position coordinates of facial feature points such as eyes, a mouth, and a nose in the face by using an image processing algorithm (for example, using a five-feature locating algorithm); and intercepting a face image including the background content according to the detected face position coordinates. Then, the cropped real face is calculated by using a depth estimation network, to obtain a depth map 404 corresponding to the face. In various embodiments of the present disclosure, the real image has a depth map, and a depth map corresponding to an attack image is black basemap. Classification and deep learning network technologies based on image information include but are not limited to LeNet, AlexNet, VGG, the Inception network, ResNet, and DenseNet. Traditional features are extracted from an image or an ROI, including but not limited to gray-scale-based features such as a mean and a variance, distribution histogram-based features, correlation matrix-based features such as GLCM and GLRLM, and signal features based on Fourier transform of images.

Step 302: The apparatus for training an image processing model performs style transfer on to-be-corrected eye images in the to-be-corrected eye image set through a style transfer network included in the image processing model, to obtain a target eye image.

In various embodiments of the present disclosure, processing the to-be-corrected eye images in the to-be-corrected eye image set through the style transfer network included in the image processing model to obtain the target eye image may be implemented by:

determining a model parameter of a reference style transfer network corresponding to the usage environment of the image processing model based on the usage environment of the image processing model; adjusting a model parameter of the style transfer network included in the image processing model based on the model parameter of the reference style transfer network; and performing style transfer on to-be-corrected eye images in the to-be-corrected eye image set through the adjusted style transfer network, to obtain a target eye image, a style feature of the target eye image matching a gaze position of a target object. 3D modeling-based eye data collection: Synthesized eyes are constructed through 3D modeling, and a gaze position of the synthesized eyes is changed to capture eye images, to construct a synthesized eye data pair $(S_i, S_t)$ of a synthesized to-be-corrected eye image and a synthesized corrected eye image, Si being the synthesized to-be-corrected eye image, and $S_t$ being the synthesized corrected eye image.

Figure 5:
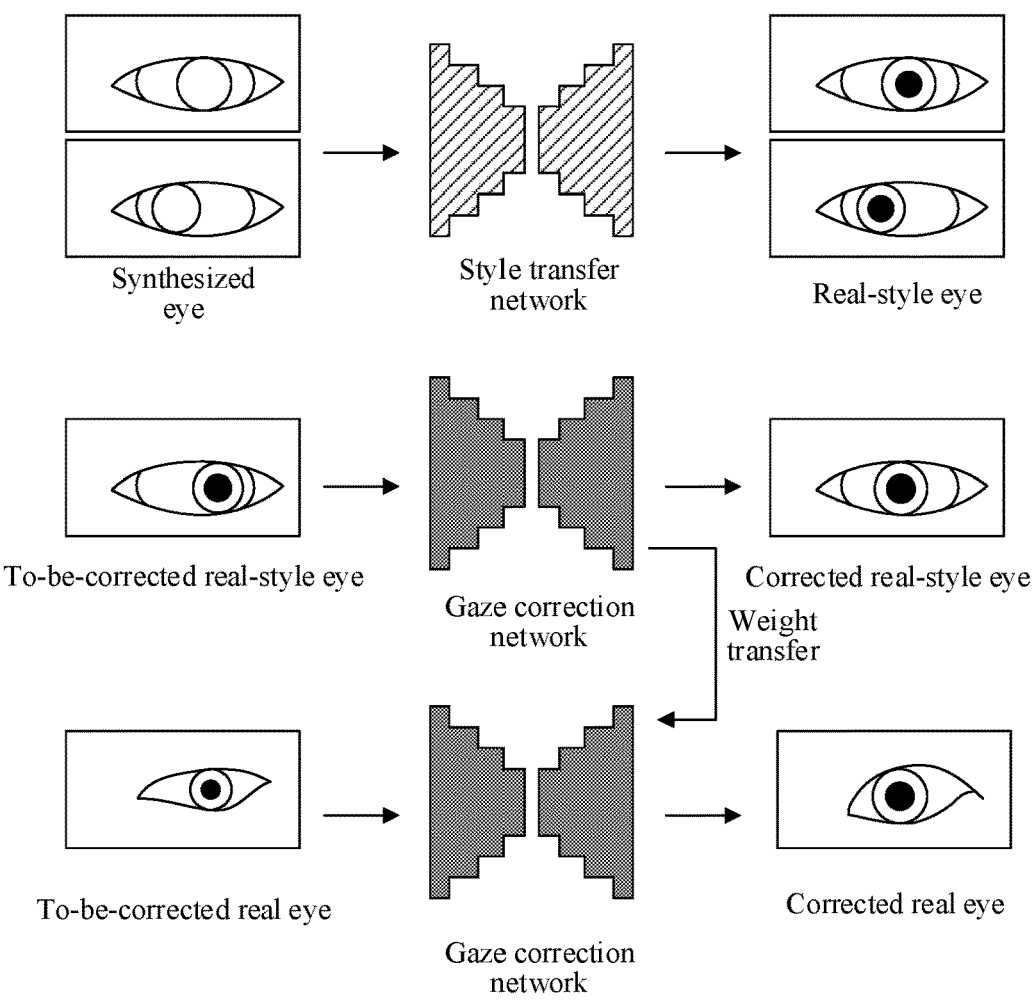
FIG. 5 is a schematic diagram of a style transfer effect of an image processing model according to the present disclosure.

FIG. 5 is a schematic diagram of a style transfer effect of the image processing model according to an embodiment of the present disclosure. When the image processing model is applied to other entertainment apps or applets, a model parameter of the style transfer network may be freely adjusted according to use habits of the user, such as style transfer. For example, the model parameter of the style transfer network may be a display effect parameter of eye image special effects of cartoon entertainment. In some embodiments, initial processing may include: intercepting a face image including a to-be-processed eye image from each sample image for a collected sample image set (a set composed of sample images) including the to-be-processed eye image in the data collection stage; and aligning the captured face images based on feature points of the to-be-processed eye image. Thus, a coder may accurately learn style features and gaze angles of the face. The collected synthesized eye data (for example, the synthesized eyes shown in FIG. 5) is input to a style transfer neural network F, to obtain a large number of real-style eye images (for example, the real-style eyes shown in FIG. 5). A calculation formula therefor is shown as a formula (1) to a formula (2):

$$\hat{I}_i = F(S_i) \tag{1}$$

$$\hat{I}_t = F(S_t) \tag{2}$$

$\hat{I}_i$ is the to-be-corrected real-style eye image, and $\hat{I}_t$ is the corrected real-style eye image.

In some embodiments, the initial processing may include: performing random augmentation on the face image; performing random distortion on the face image after the random augmentation to obtain a distorted face image; and intercepting a five-feature image of the to-be-processed eye image in the distorted face image, and scaling the intercepted eye image to obtain any to-be-corrected eye image in the to-be-corrected eye image set, the any to-be-corrected eye image matching an input resolution supported by a coder in the image processing model.

In an example, the random augmentation of the face image may be implemented by: performing random rotation around a center of the face image; performing random scaling on the face image after the random rotation; and performing random translation on the face image after the random scaling.

In an example, the random distortion of the face image after the random augmentation may be implemented by:

inserting noise into the face image after the random augmentation. The noise includes at least one of fixed noise (that is, with a fixed color value) or dynamic noise (that is, with a variable color value).

Inserting dynamic noise into the face image after the random augmentation may mean meshing the face image after the random augmentation, assigning coordinates to at least partial nodes, and adding noise to the coordinates according to a Gaussian distribution; and performing image interpolation (such as linear interpolation or nonlinear interpolation) in a region outside the nodes to enlarge the face image. When linear interpolation is performed, a value of an interpolated pixel may be positively correlated with values of the coordinates.

Step 303: The apparatus for training an image processing model acquires a training sample matching the usage environment of the image processing model based on the to-be-corrected eye images and the target eye image.

The training sample includes user eye images matching different gaze positions.

Step 304: The apparatus for training an image processing model trains a correction network included in the image processing model through the training sample matching the usage environment of the image processing model, to obtain a model update parameter matching the correction network, and generates a trained image processing model based on the model update parameter.

In this way, the eye images in the usage environment can be corrected through the trained image processing model.

As shown in FIG. 5, a to-be-corrected eye image (that is, the to-be-corrected real eye) and the target eye image (the to-be-corrected real-style eye) are used as the training sample matching the usage environment of the image processing model, and the correction network (for example, the gaze correction network shown in FIG. 5) is trained through the to-be-corrected real eye and the to-be-corrected real-style eye.

Figure 6:
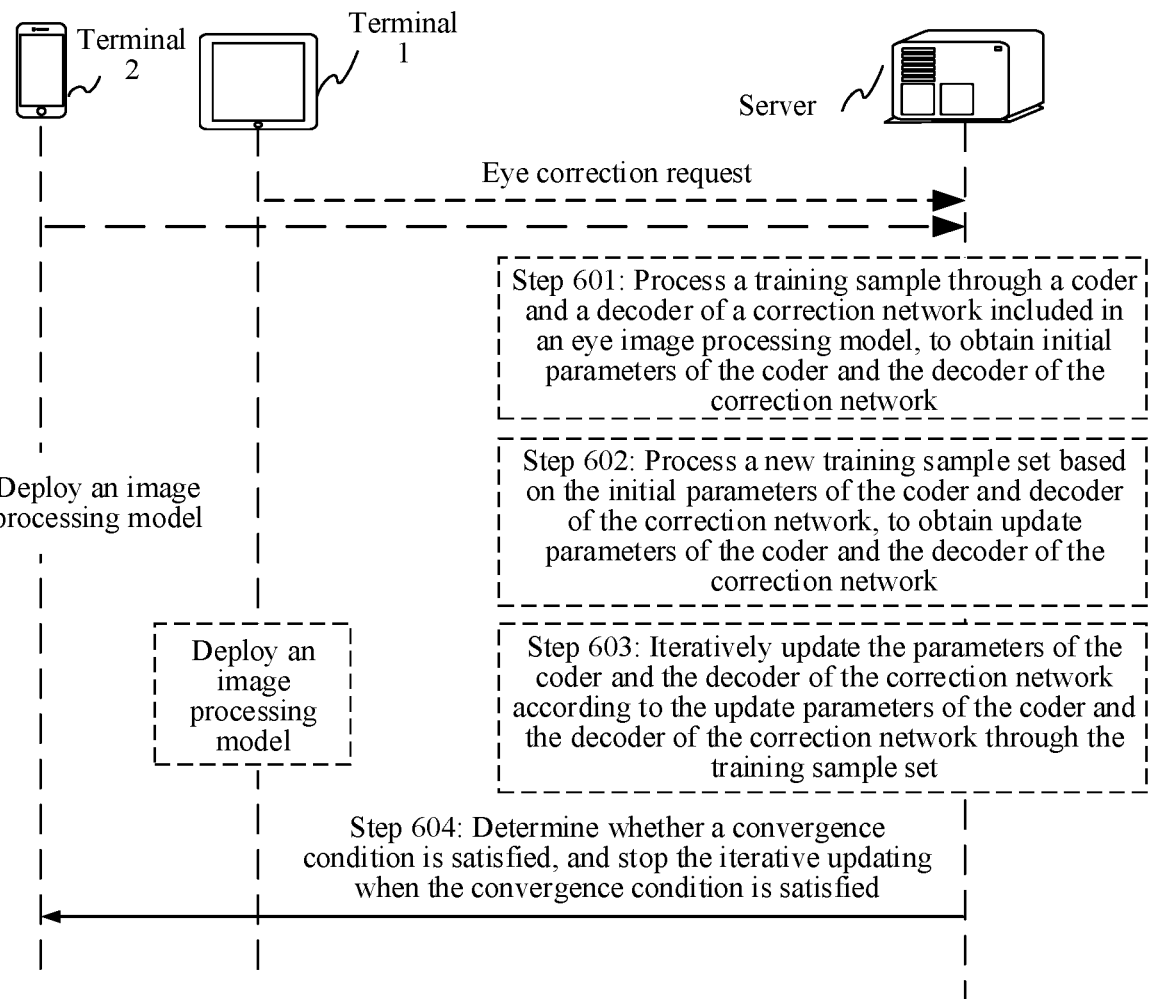
FIG. 6 is a schematic flowchart of a method for training an image processing model according to the present disclosure.

FIG. 6 is a schematic flowchart of the method for training an image processing model according to an embodiment of the present disclosure. It may be understood that steps shown in FIG. 6 may be performed by various electronic devices that run the apparatus for training an image processing model, such as a dedicated terminal with an eye information detection function or a server or a server cluster with an image processing model training function, to realize training and deployment of image processing models matching different image processing scenarios of video conferences. The steps shown in FIG. 6 are exemplarily described below.

Step 601: Process a training sample set through a coder and a decoder of the correction network included in the image processing model, to obtain initial parameters of the coder and the decoder of the correction network.

Step 602: Process a new training sample set based on the initial parameters of the coder and decoder of the correction network, to obtain update parameters of the coder and the decoder of the correction network.

During determination of the update parameters, different training samples in the new training sample set may be substituted into loss functions corresponding to the coder and the decoder of the correction network, and it is determined that the coder and the decoder of the correction network correspond to the update parameters when the loss functions satisfy a corresponding convergence condition.

Step 603: Iteratively update the parameters of the coder and the decoder of the correction network according to the update parameters of the coder and the decoder of the correction network through the training sample set.

Step 604: Determine whether a convergence condition is satisfied, and stop the iterative updating when the convergence condition is satisfied.

Different training samples in the new training sample set may be substituted into the loss functions corresponding to the coder and the decoder of the correction network, and it is determined that the coder and the decoder of the correction network correspond to the update parameters when the loss functions satisfy the corresponding convergence condition. The converted real-style eye image is used for the training of a gaze correction network G. For the training process, refer to formula (3):

$$\underset{G}{\operatorname{argminLoss}} \left( G(\hat{I}_i), \hat{I}_t \right). \tag{3}$$

LOSS(.) is the loss function, which may use an error of mean square, $\hat{I}_i$ is the to-be-corrected real-style eye image, and $\hat{I}_t$ is the corrected real-style eye image.

During parameter optimization of the correction network, a small number of real eye data pairs ($I_i$, $I_t$) and the correction network obtained in the previous embodiment may be further used for optimized training. For the optimization, refer to formula (4):

$$\underset{G}{\operatorname{argmin}} \|G(I_i) - I_t\|_2. \tag{4}$$

$I_i$ is a to-be-corrected real eye image, and $I_t$ is a corrected real eye image.

In actual application, since the solutions of the embodiments of the present disclosure can be implemented through the APP with the image processing function and the instant applet, and the image processing model can be invoked by other video conference programs, through a video conferencing cloud server network, the user can quickly detect the faces of different objects through the image processing model deployed in the cloud server network when a terminal is changed.

Specifically, a target user identifier, the model parameters of the image processing model, and a video conference scenario identifier may be transmitted to the cloud server network. When a corresponding image processing process is triggered, the target user identifier, the model parameters of the image processing model, and the video conference scenario identifier are acquired through the cloud server network for use in the corresponding image processing process, so as to detect and correct eyes of the target object in the video conference application scenario, thereby helping an eye detection model recognize the eyes of the target object in time.

The embodiments of the present disclosure may be implemented in combination with a cloud technology. The cloud technology is a hosting technology that unifies a series of resources such as hardware, software, and networks in a wide area network or a local area network to realize calculation, storage, processing, and sharing of data, which may be understood as a general term for a network technology, an information technology, an integration technology, a platform management technology, and an application technology applied based on a cloud computing business model. A background service of a technical network system requires a large amount of computing and storage resources, such as video websites, image websites, and more portal websites. Therefore, a cloud technology needs to be supported by cloud computing.

It should be noted that cloud computing is a computing mode, in which computing tasks are distributed on a resource pool formed by a large quantity of computers, so that various application systems can obtain computing power, storage space, and information services according to requirements. A network that provides resources is referred to as a "cloud". For a user, resources in a "cloud" seem to be infinitely expandable, and can be obtained readily, used on demand, expanded readily, and paid by use. A provider for basic capabilities of cloud computing establishes a cloud computing resource pool platform (referred to as a cloud platform for short) is generally referred to as infrastructure as a service (IaaS). Various virtual resources are deployed in a resource pool for selection and use by external users. The cloud computing resource pool mainly includes computing devices (which may be virtualized machines, including operating systems), storage devices, and network devices.

With reference to the description of FIG. 1, the method for training an image processing model provided in various embodiments of the present disclosure may be implemented by a corresponding cloud device. For example, the terminal (including the terminal 10-1 and the terminal 10-2) is connected to the server 200 located in the cloud through the network 300. The network 300 may be a wide area network, a local area network, or a combination thereof. The server 200 may be a physical device or a virtualized device.

Figure 7:
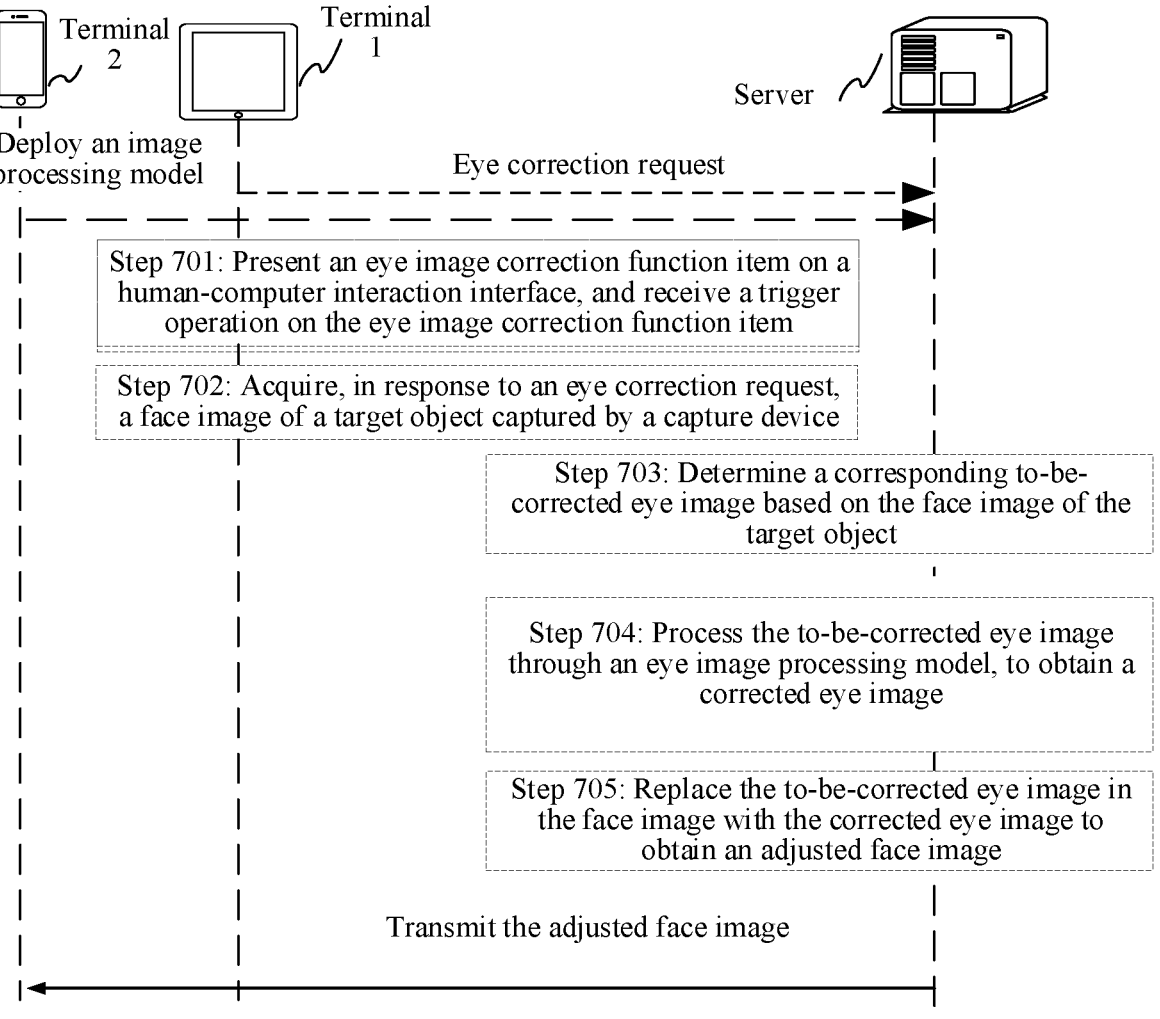
FIG. 7 is a schematic flowchart of an image processing method according to an embodiment of the present disclosure.

FIG. 7 is a schematic flowchart of an image processing method according to an embodiment of the present disclosure. It may be understood that steps shown in FIG. 7 may be performed by various electronic devices that run the image processing apparatus, such as an applet with an image processing function, a communication terminal with an image processing function, or a video conference terminal, to implement training and deployment of image processing models matching different image processing scenarios of video conferences. The steps shown in FIG. 7 are exemplarily described below.

Step 701: Present an eye image correction function item on a human-computer interaction interface, and receive a trigger operation on the eye image correction function item.

Figure 8:
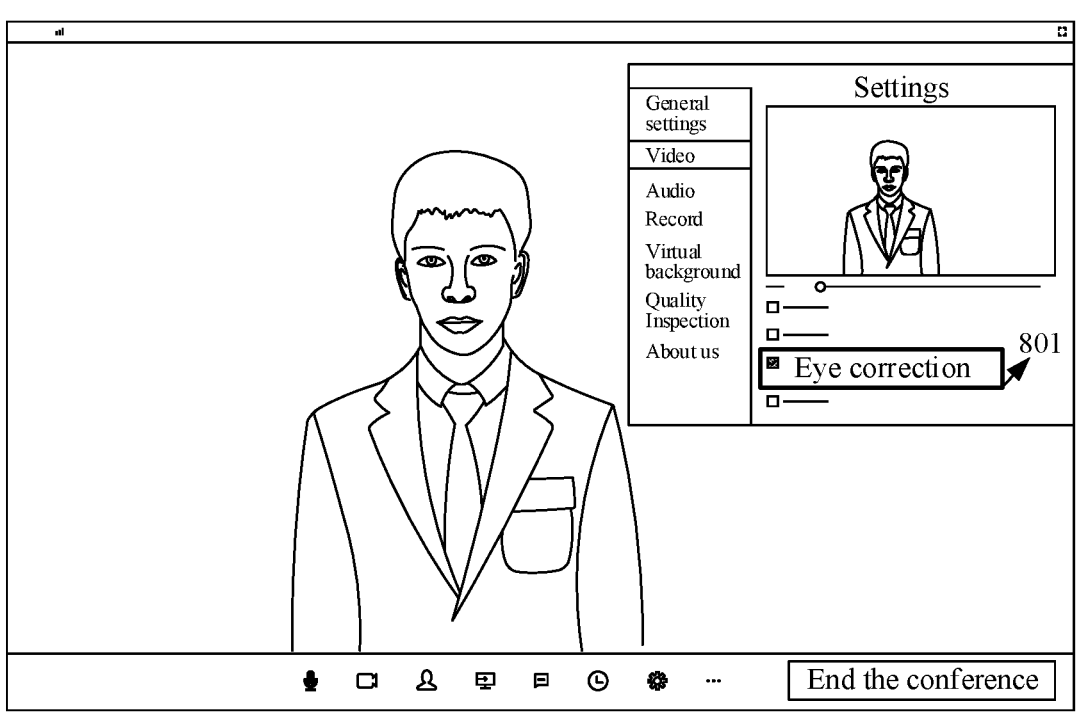
FIG. 8 is a schematic diagram of a use scenario of the image processing method according to an embodiment of the present disclosure.

FIG. 8 is a schematic diagram of a use scenario of the image processing method according to an embodiment of the present disclosure. On a running interface of a video conference client (or the applet), a to-be-corrected eye image including the target object is acquired and presented in response to the trigger operation on the eye image correction function item 801.

A target eye image of a target eye image template is generated and presented in response to a transform determination operation triggered based on the to-be-corrected eye image, the target eye image of the target eye image template being an image generated by replacing an eye part in the target eye image template with an eye part in the to-be-corrected eye image. Due to the different image acquisition angles of a user in the video conference process, model parameters of the image processing model matching the different image acquisition angles are different. In order to reduce the model adjustment time, a fixed model parameter may be configured for a fixed image acquisition angle. For example, a model parameter of the image processing model when the image acquisition angle is 90 degrees or 75 degrees may be stored in a corresponding storage medium. When the target eye image of the target eye image template is being presented, a template selection instruction may be received, so that the model parameter of the image processing model can be quickly adjusted, thereby reducing the waiting time.

Step 702: Acquire, in response to an eye correction request, a face image of the target object captured by a capture device.

Step 703: Determine a corresponding to-be-corrected eye image based on the face image of the target object.

Figure 9:
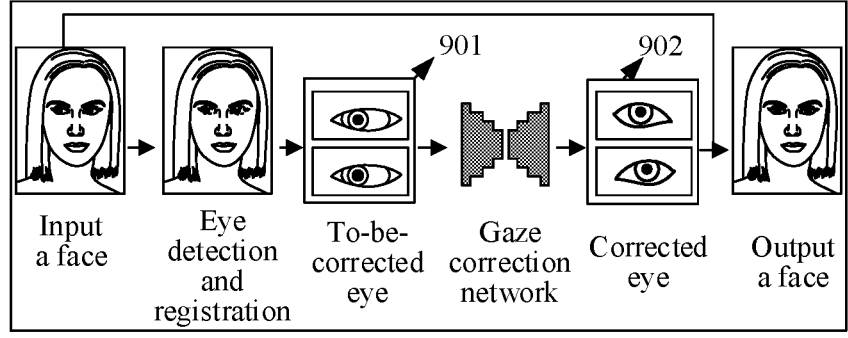
FIG. 9 is a schematic diagram of a use scenario of the image processing method according to an embodiment of the present disclosure.

FIG. 9 is a schematic diagram of a use scenario of the image processing method according to an embodiment of the present disclosure. The to-be-corrected eye image (for example, a to-be-corrected eye 901 shown in FIG. 9) may include a left eye image and a right eye image of the target object, or may only include the left eye image or only the right eye image. Specifically, due to the image acquisition angles of the object and the different ambient light intensities of the eye images, when the object image acquisition angle is 90 degrees or 75 degrees, only the left eye image or the right eye image may be captured, and adaptive adjustment may be performed, to realize gaze correction, thereby reducing the calculation amount of the image processing model of the video conference applet, and reducing the waiting time.

Step 704: Process the to-be-corrected eye image through an image processing model, to obtain a corrected eye image.

In various embodiments of the present disclosure, an image sharing function item for sharing the face image may be further presented on the human-computer interaction interface, and the adjusted face image of the target object is shared in response to a trigger operation on the image sharing function item. The image sharing function item may be associated with a default sharing path, for example, may be a function item for sharing to instant messaging software or social software. Alternatively, a sharing interface including at least two sharing path selection items may be presented in response to trigger of the face image sharing function item. In response to a path sharing selection operation triggered based on the sharing interface, the face image is shared to different social application processes or image interception (or screen recording) application processes through the selected sharing path, and the generated new image is shared or intercepted.

As shown in FIG. 9, the to-be-corrected eye 901 is corrected through the gaze correction network included in the image processing model to obtain a corrected eye 902 (that is, the corrected eye image). It should be noted that in various embodiments of the present disclosure, after the eye image correction function item shown in FIG. 8 is triggered, the to-be-corrected eye image is first processed through the style transfer network of the image processing model to form a target eye image, a style feature of the target eye image matching a gaze position of the target object, and then the target eye image is corrected through the gaze correction network to obtain a corrected eye.

Step 705: Replace the to-be-corrected eye image in the face image with the corrected eye image to obtain an adjusted face image.

Figure 10:
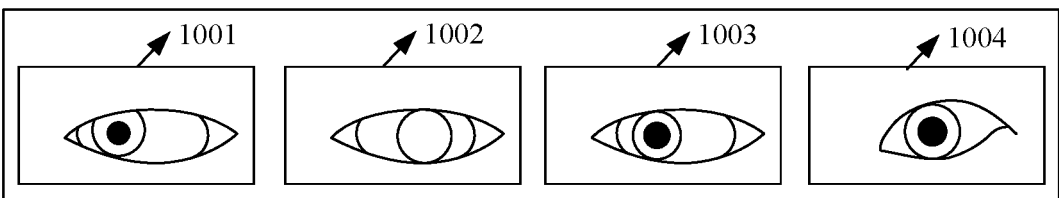
FIG. 10 is a schematic diagram of comparison of image processing effects according to an embodiment of the present disclosure.

FIG. 10 is a schematic diagram of comparison of image processing effects according to an embodiment of the present disclosure. FIG. 1001 is a to-be-processed eye image (that is, an input image), FIG. 1002 is an eye image synthesized based on 3D modeling, FIG. 1003 is an eye image (that is, an eye image generated without transfer learning) generated by the gaze correction network after training and learning with limited real eye data, and FIG. 1004 is an eye image generated based on transfer learning and the gaze correction network of the embodiments of the present disclosure. It can be learned that, compared with the technical solution of 3D modeling, the embodiments of the present disclosure can generate a more realistic and natural eye image with the same style as the input image. Compared with a deep learning solution without transfer learning, the embodiments of the present disclosure realize a more desirable gaze correction effect.

As such, the embodiments of the present disclosure provide the following beneficial effects.

The correction network of the image processing model is trained through the training sample set matching the usage environment of the image processing model, to obtain the model update parameter matching the correction network, and the trained image processing model is generated based on the model update parameter, to realize correction of the eye images in the usage environment through the image processing model, which can improve the training efficiency of the image processing model and reduce the complexity of image processing while ensuring the recognition precision of the image processing model. Therefore, not only the training precision is satisfied, but also the generalization ability and the data processing ability of the image processing model are enhanced.

By deploying the trained image processing model, different image processing environments can be processed, thereby enhancing the robustness of the image processing model, reducing the use cost, and improving the user experience.

The functions of each software module in the apparatus for training an image processing model are described in detail below.

The first information transmission module 2081 is configured to acquire a to-be-corrected eye image set matching a usage environment of the image processing model. The training module 2082 is configured to process to-be-corrected eye images in a to-be-corrected eye image set through a style transfer network included in the image processing model, to obtain a target eye image. The training module 2082 is configured to acquire a training sample matching the usage environment of the image processing model based on the to-be-corrected eye images and the target eye image, the training sample including object eye images matching different gaze positions. The training module 2082 is configured to train a correction network included in the image processing model through the training sample matching the usage environment of the image processing model, to obtain a model update parameter matching the correction network, and generate a trained image processing model based on the model update parameter, the eye images in the usage environment being corrected through the trained image processing model.

In some embodiments, the first information transmission module 2081 is further configured to: acquire face images captured by a capture device, the capture device being in the usage environment of the image processing model; perform image augmentation on the face images to obtain a processing result of the image augmentation; determine face position coordinates in the processing result of image augmentation, and intercept face images including a complete eye image based on the face position coordinates; and perform depth processing on the face images including the complete eye image through a depth processing network included in the image processing model, to obtain depth maps of the face images; and use the depth maps as the to-be-corrected eye images matching the usage environment of the image processing model, and use a set of the plurality of to-be-corrected eye images as the to-be-corrected eye image set.

In some embodiments, the training module 2082 is further configured to: determine a model parameter of a reference style transfer network corresponding to the usage environment of the image processing model based on the usage environment of the image processing model; adjust a model parameter of the style transfer network included in the image processing model based on the model parameter of the reference style transfer network; and perform style transfer on the to-be-corrected eye images in the to-be-corrected eye image set through the adjusted style transfer network, to obtain a target eye image, a style feature of the target eye image matching a gaze position of a target object.

In some embodiments, the training module 2082 is further configured to: process the training sample through a coder and a decoder of the correction network included in the image processing model, to obtain initial parameters of the coder and the decoder of the correction network; process the training sample based on the initial parameters of the coder and the decoder of the correction network, to obtain update parameters of the coder and the decoder of the correction network; and iteratively update the parameters of the coder and the decoder of the correction network based on the update parameters of the coder and the decoder of the correction network through a training sample set, to obtain model parameters matching the coder and the decoder matching the correction network.

In some embodiments, the training module 2082 is further configured to: substitute the training sample into loss functions corresponding to the coder and the decoder of the correction network; and determine that the coder and the decoder of the correction network correspond to the update parameters when the loss functions satisfy a corresponding convergence condition.

In some embodiments, the first information transmission module 2081 is further configured to: acquire a face image captured by a capture device in the usage environment of the image processing model, and perform random augmentation on the face image; perform random distortion on the face image after the random augmentation to obtain a distorted face image; and intercept an eye image in the distorted face image, and scale the intercepted eye image to obtain any to-be-corrected eye image in the to-be-corrected eye image set, the any to-be-corrected eye image matching an input resolution supported by a coder in the image processing model.

In some embodiments, the first information transmission module 2081 is further configured to: perform random rotation around a center of the face image; perform random scaling on the face image after the random rotation; and perform random translation on the face image after the random scaling.

In some embodiments, the first information transmission module 2081 is further configured to: insert noise into the face image after the random augmentation, the noise including at least one of fixed noise or dynamic noise.

The functions of each software module in the image processing apparatus are described in detail below.

The second information transmission module 2083 is configured to acquire a face image of a target object. The information processing module 2084 is configured to determine a corresponding to-be-corrected eye image based on the face image of the target object, the to-be-corrected eye image including a left eye image and a right eye image of the target object. The information processing module 2084 is configured to correct the to-be-corrected eye image through an image processing model, to obtain a corrected eye image. The information processing module 2084 is configured to replace the to-be-corrected eye image in the face image with the corrected eye image, the image processing model being obtained by training by using the method for training an image processing model.

In some embodiments, the second information transmission module 2083 is further configured to: present an eye image correction function item on a human-computer interaction interface; acquire and present a to-be-corrected eye image including the target object in response to a trigger operation on the eye image correction function item; and generate and present a target eye image of a target eye image template in response to a transform determination operation triggered based on the to-be-corrected eye image, the target eye image of the target eye image template being an image generated by replacing an eye part in the target eye image template with an eye part in the to-be-corrected eye image.

In some embodiments, the second information transmission module 2083 is further configured to: present an image sharing function item for sharing the face image on the human-computer interaction interface; and share the adjusted face image in response to a trigger operation on the image sharing function item.

According to the apparatus for training an image processing model and the image processing apparatus packaged in the electronic device shown in FIG. 2, the embodiment of the present disclosure further provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, so that the computer device performs the different embodiments and combinations of embodiments provided in the various alternative implementations of the foregoing method for training an image processing model and the image processing apparatus.

The foregoing are merely embodiments of the present disclosure, but are not applied to limit the protection scope of the present disclosure. Any modification, equivalent replacement, and improvement made without departing from the spirit and principle of the present disclosure shall fall within the protection scope of the present disclosure.

What is claimed is:

1. A method for training an image processing model, applied to an electronic device, the method comprising:

acquiring an eye image set matching a usage environment of the image processing model, the usage environment of the image processing model comprising at least one of: an image capture device, an image acquisition angle, or an image resolution;

performing style transfer on eye images in the eye image set through a style transfer network comprised in the image processing model, to obtain a target eye image, the performing the style transfer on the eye image to obtain the target eye image comprising: determining a model parameter of a reference style transfer network corresponding to the usage environment of the image processing model based on the usage environment of the image processing model; adjusting a model parameter of the style transfer network comprised in the image processing model based on the model parameter of the reference style transfer network; and performing style transfer on the eye images in the eye image set through the adjusted style transfer network, to obtain the target eye image, a style feature of the target eye image matching a gaze position of a target object;

acquiring a training sample matching the usage environment of the image processing model based on the eye images and the target eye image, the training sample comprising object eye images matching different gaze positions;

training a correction network comprised in the image processing model through the training sample matching the usage environment of the image processing model, to obtain a model update parameter matching the correction network; and generating a trained image processing model based on the model update parameter.

2. The method according to claim 1, wherein acquiring the eye image set matching the usage environment of the image processing model comprises:

acquiring face images captured by a capture device;

performing image augmentation on the face images to obtain a processing result of the image augmentation;

determining face position coordinates in the processing result of the image augmentation, and intercepting face images comprising a complete eye image based on the face position coordinates;

performing depth processing on the face images comprising the complete eye image through a depth processing network comprised in the image processing model, to obtain depth maps of the face images; and using the depth maps as first eye images matching the usage environment of the image processing model, the training sample comprising the first eye images.

3. The method according to claim 1, wherein training the correction network comprised in the image processing model through the training sample matching the usage environment of the image processing model, to obtain the model update parameter matching the correction network comprises:

processing the training sample through a coder and a decoder of the correction network comprised in the image processing model, to obtain initial parameters of the coder and the decoder of the correction network;

processing the training sample based on the initial parameters of the coder and the decoder of the correction network, to obtain update parameters of the coder and the decoder of the correction network; and iteratively updating the parameters of the coder and the decoder of the correction network based on the update parameters of the coder and the decoder of the correction network through a training sample set, to obtain model update parameters of the coder and the decoder matching the correction network.

4. The method according to claim 3, wherein processing the training sample based on the initial parameters of the coder and the decoder of the correction network, to obtain the update parameters of the coder and the decoder of the correction network comprises:

substituting the training sample into loss functions corresponding to the coder and the decoder of the correction network; and determining that the coder and the decoder of the correction network correspond to the update parameters when the loss functions satisfy a corresponding convergence condition.

5. The method according to claim 1, further comprising:

acquiring a face image captured by a capture device and performing random augmentation on the face image;

performing random distortion on the face image after the random augmentation to obtain a distorted face image; and intercepting an eye image in the distorted face image, and scaling the intercepted eye image to obtain an eye image in the eye image set, the obtained eye image matching an input resolution supported by a coder in the image processing model.

6. The method according to claim 5, wherein performing the random augmentation on the face image comprises:

performing random rotation around a center of the face image;

performing random scaling on the face image after the random rotation; and performing random translation on the face image after the random scaling.

7. The method according to claim 5, wherein performing the random distortion on the face image after the random augmentation comprises:

inserting noise into the face image after the random augmentation, the noise comprising at least one of fixed noise or dynamic noise.

8. The method according to claim 1, further comprising:

acquiring a face image of a target object;

determining a first eye image to be corrected based on the face image of the target object, the first eye image comprising a left eye image and a right eye image of the target object;

correcting the first eye image through the image processing model, to obtain a corrected eye image; and replacing the first eye image in the face image with the corrected eye image.

9. The method according to claim 8, further comprising:

presenting an eye image correction function item on a human-computer interaction interface;

acquiring and presenting a first eye image comprising the target object in response to a trigger operation on the eye image correction function item; and generating and presenting a target eye image of a target eye image template in response to a transform determination operation triggered based on the first eye image, the target eye image of the target eye image template being an image generated by replacing an eye part in the target eye image template with an eye part in the first eye image.

10. An electronic device, comprising:

a memory, configured to store executable instructions; and a processor, configured to implement, when executing the executable instructions stored in the memory, a method for training an image processing model, the method comprising:

acquiring an eye image set matching a usage environment of the image processing model, the usage environment of the image processing model comprising at least one of: an image capture device, an image acquisition angle, or an image resolution;

performing style transfer on eye images in the eye image set through a style transfer network comprised in the image processing model, to obtain a target eye image, the performing the style transfer on the eye image to obtain the target eye image comprising: determining a model parameter of a reference style transfer network corresponding to the usage environment of the image processing model based on the usage environment of the image processing model; adjusting a model parameter of the style transfer network comprised in the image processing model based on the model parameter of the reference style transfer network; and performing style transfer on the eye images in the eye image set through the adjusted style transfer network, to obtain the target eye image, a style feature of the target eye image matching a gaze position of a target object;

acquiring a training sample matching the usage environment of the image processing model based on the eye images and the target eye image, the training sample comprising object eye images matching different gaze positions; and training a correction network comprised in the image processing model through the training sample matching the usage environment of the image processing model, to obtain a model update parameter matching the correction network, and generating a trained image processing model based on the model update parameter.

11. The electronic device according to claim 10, wherein acquiring the eye image set matching the usage environment of the image processing model comprises:

acquiring face images captured by a capture device;

performing image augmentation on the face images to obtain a processing result of the image augmentation;

determining face position coordinates in the processing result of the image augmentation, and intercepting face images comprising a complete eye image based on the face position coordinates;

performing depth processing on the face images comprising the complete eye image through a depth processing network comprised in the image processing model, to obtain depth maps of the face images; and using the depth maps as first eye images matching the usage environment of the image processing model, the training sample comprising the first eye images.

12. The electronic device according to claim 10, wherein training the correction network comprised in the image processing model through the training sample comprises:

processing the training sample through a coder and a decoder of the correction network comprised in the image processing model, to obtain initial parameters of the coder and the decoder of the correction network;

processing the training sample based on the initial parameters of the coder and the decoder of the correction network, to obtain update parameters of the coder and the decoder of the correction network; and iteratively updating the parameters of the coder and the decoder of the correction network based on the update parameters of the coder and the decoder of the correction network through a training sample set, to obtain model update parameters of the coder and the decoder matching the correction network.

13. A non-transitory computer-readable storage medium, storing executable instructions, the executable instructions, when executed by a processor, implementing a method for training an image processing model, the method comprising:

acquiring an eye image set matching a usage environment of the image processing model, the usage environment of the image processing model comprising at least one of: an image capture device, an image acquisition angle, or an image resolution;

performing style transfer on eye images in the eye image set through a style transfer network comprised in the image processing model, to obtain a target eye image, the performing the style transfer on the eye image to obtain the target eye image comprising: determining a model parameter of a reference style transfer network corresponding to the usage environment of the image processing model based on the usage environment of the image processing model; adjusting a model parameter of the style transfer network comprised in the image processing model based on the model parameter of the reference style transfer network; and performing style transfer on the eye images in the eye image set through the adjusted style transfer network, to obtain the target eye image, a style feature of the target eye image matching a gaze position of a target object;

acquiring a training sample matching the usage environment of the image processing model based on the eye images and the target eye image, the training sample comprising object eye images matching different gaze positions; and training a correction network comprised in the image processing model through the training sample matching the usage environment of the image processing model, to obtain a model update parameter matching the correction network, and generating a trained image processing model based on the model update parameter.

14. The storage medium according to claim 13, wherein acquiring the eye image set matching the usage environment of the image processing model comprises:

acquiring face images captured by a capture device;

performing image augmentation on the face images to obtain a processing result of the image augmentation;

determining face position coordinates in the processing result of the image augmentation, and intercepting face images comprising a complete eye image based on the face position coordinates;

performing depth processing on the face images comprising the complete eye image through a depth processing network comprised in the image processing model, to obtain depth maps of the face images; and using the depth maps as first eye images matching the usage environment of the image processing model, the training sample comprising the first eye images.

15. The storage medium according to claim 13, wherein training the correction network comprised in the image processing model through the training sample matching the usage environment of the image processing model, to obtain the model update parameter matching the correction network comprises:

processing the training sample through a coder and a decoder of the correction network comprised in the image processing model, to obtain initial parameters of the coder and the decoder of the correction network;

processing the training sample based on the initial parameters of the coder and the decoder of the correction network, to obtain update parameters of the coder and the decoder of the correction network; and iteratively updating the parameters of the coder and the decoder of the correction network based on the update parameters of the coder and the decoder of the correction network through a training sample set, to obtain model update parameters of the coder and the decoder matching the correction network.

16. The storage medium according to claim 15, wherein processing the training sample based on the initial parameters of the coder and the decoder of the correction network, to obtain the update parameters of the coder and the decoder of the correction network comprises:

substituting the training sample into loss functions corresponding to the coder and the decoder of the correction network; and determining that the coder and the decoder of the correction network correspond to the update parameters when the loss functions satisfy a corresponding convergence condition.

* * * * *